United States Patent
Miller, Jr. et al.

[15] 3,670,906
[45] June 20, 1972

[54] ARTICLE LOADING SYSTEM

[72] Inventors: Frank H. Miller, Jr., Louisville; David L. Witherspoon, Anchorage, both of Ky.

[73] Assignee: Miller Engineering Corporation, Louisville, Ky.

[22] Filed: Jan. 14, 1970

[21] Appl. No.: 2,777

[52] U.S. Cl.........................214/6 P, 198/31 AC, 198/33 AB, 214/11 A
[51] Int. Cl.........................B65g 57/24
[58] Field of Search.........................214/6 P, 6 K, 6 H, 11 A; 198/31 R, 31 AC, 33 AB

[56] References Cited

UNITED STATES PATENTS

| | | | |
|---|---|---|---|
| 1,868,894 | 7/1932 | Glahn | 214/11 AST X |
| 2,666,536 | 1/1954 | Smith | 214/11 AST |
| 2,807,376 | 9/1957 | Lens | 214/11 AST X |
| 2,825,476 | 3/1958 | Muller | 214/11 AST |
| 3,521,736 | 7/1970 | Von Gal, Jr. et al | 214/6 P X |
| 3,346,128 | 10/1967 | Hullhorst | 214/6 DK |
| 3,442,400 | 5/1969 | Roth et al. | 214/6 P |
| 3,278,048 | 10/1966 | Bruce | 214/6 P |
| 2,815,870 | 12/1957 | Laub | 214/6 P |
| 3,471,038 | 10/1969 | Verrinder | 214/6 DK |
| 3,529,732 | 9/1970 | Wayne | 214/6 DK |

FOREIGN PATENTS OR APPLICATIONS

| | | | |
|---|---|---|---|
| 1,288,044 | 2/1962 | France | 214/6 DK |
| 1,129,944 | 10/1968 | Great Britain | 214/6 DK |

*Primary Examiner*—Robert J. Spar
*Attorney*—William R. Price

[57] ABSTRACT

Discloses a feed conveyor and a main or receiving conveyor in the form of an endless belt trained over two or more sprockets and containing a series of openings or apertures through which articles on the conveyor are fed gravitationally onto an elevator. A fixed stop is located over the elevator so that articles, fed onto the conveyor, are selectively turned so as to form an open pattern in an accumulating zone on said conveyor and ultimately come into abutting relation with the stop. The open pattern is closed and is held in fixed position until one of said apertures comes into registry with the elevator below the fixed stop so that the layer or pattern of articles held in said position pass gravitationally through said aperture onto a pallet on said elevator platform. A unique control system involves the use of an auxilliary control conveyor driven in synchronism with the main conveyor and which contains actuating members in the form of cams judiciously placed so as to actuate control members, such as limit switches or pneumatic valves to perform specific functions at specific points on said conveyor.

5 Claims, 14 Drawing Figures

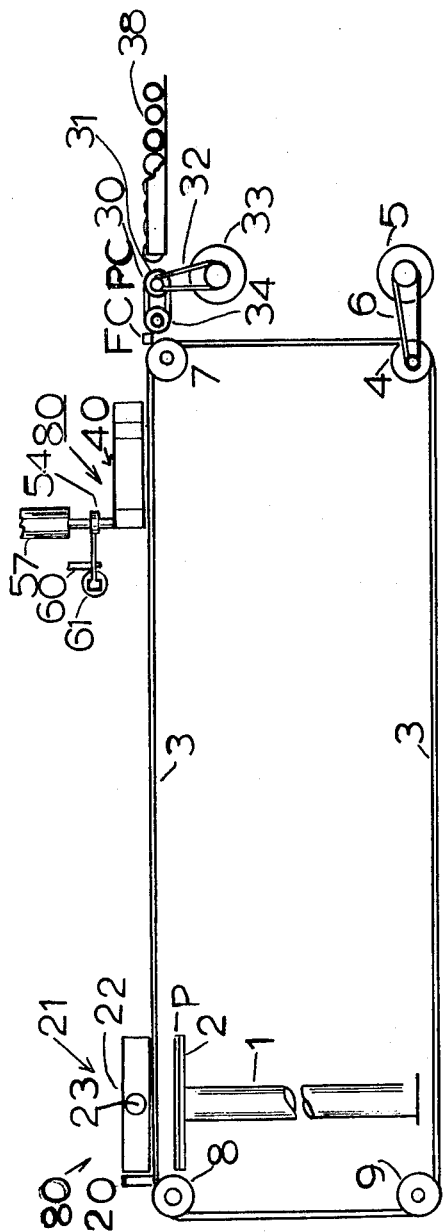
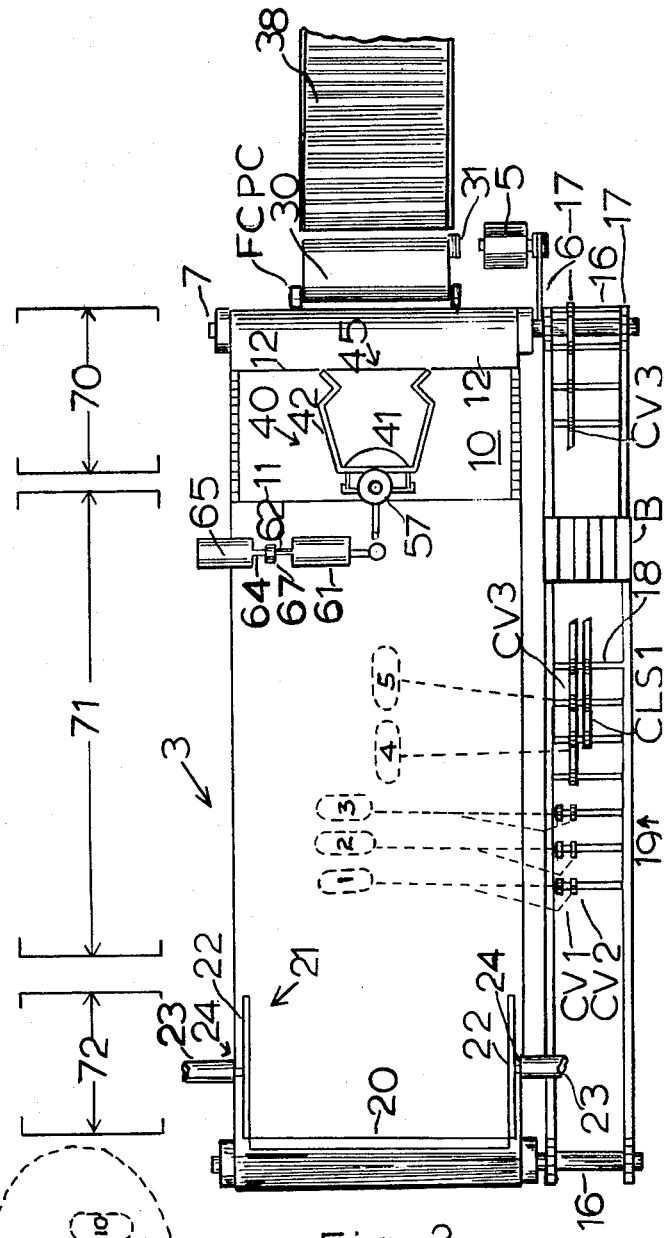

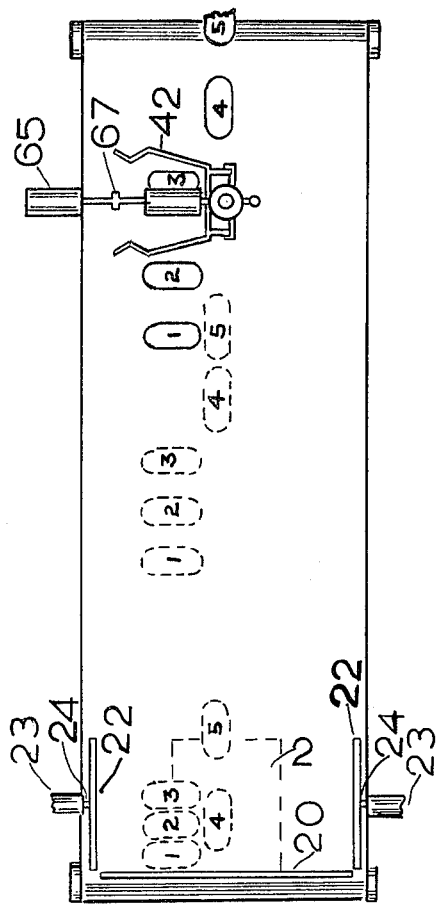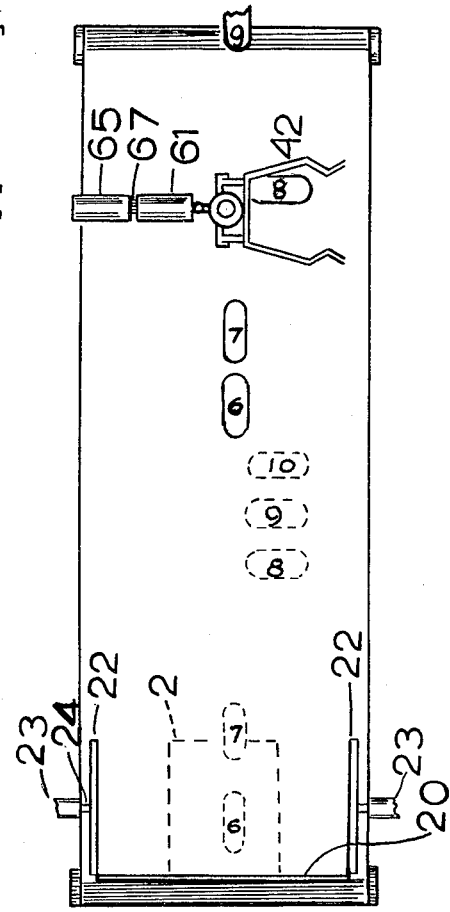
Fig 3
Fig. 5
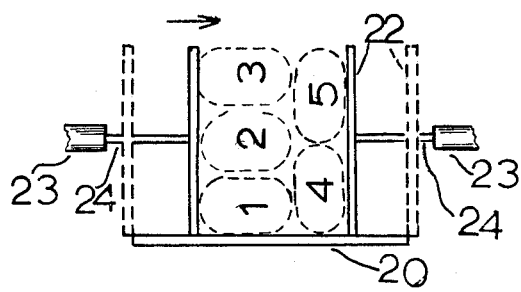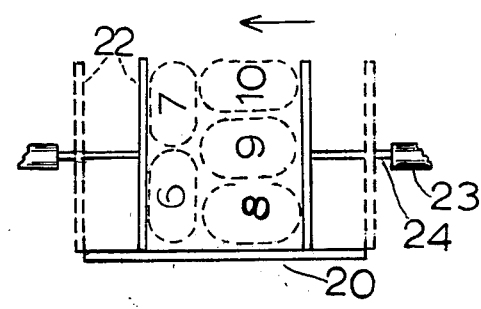
Fig. 4
Fig. 6
INVENTOR.
Frank H. Miller Jr.
BY David L. Witherspoon
Attorney INVENTOR.
Frank H. Miller Jr.
David L. Witherspoon
BY
Wm. R. Price
Attorney

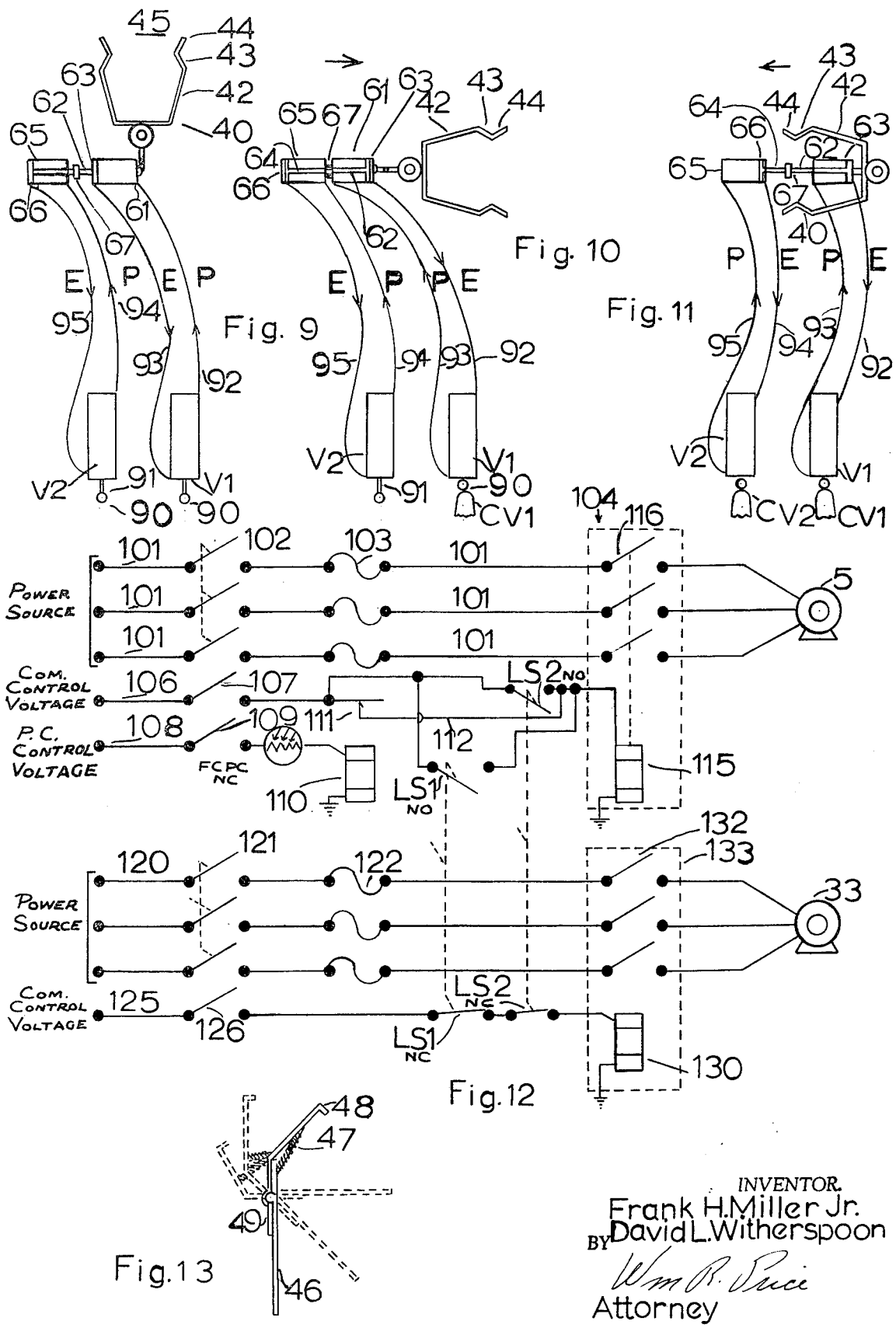

ARTICLE LOADING SYSTEM

FIELD OF THE INVENTION

This invention relates to an article loading system for loading pallets and has for its object to provide a completely automatic system for loading pallets with cartons, bags or the like received from one or more conveyor lines in layers onto a vertically movable elevator which is incrementally lowered to receive successive layers of said articles.

DESCRIPTION OF THE PRIOR ART

Present day material handling is based upon the use of pallets which are portable platforms, having a size approximately 4 feet by 4 feet. Pallets are used to receive cartons, boxes or bags from factory packaging lines and are used for moving these cartons to the carrier or warehouse and are used for supporting the boxes or bags during transportation or storage. Previously, pallet loading has been performed by hand labor. Recently, there has been introduced into the art a series of automatic machines for loading pallets. With these machines, empty pallets are fed into one side and articles such as cartons, bags or boxes are fed in on the other side, in the form of patterned layers, onto the pallet supported on a vertically movable elevator. This elevator is incrementally lowered to receive successive layered patterns. Examples of the pallet loading machines are as follows: U.S. Pat. No. 2,401,592 to Van Stocker; U.S. Pat. No. 2,633,251 to Bruce; U.S. Pat. No. 3,164,080 to Miller; U.S. Pat. No. 2,508,861 to Jessen; U.S. Pat. No. 2,655,271 to Cole; and U.S. Pat. No. 2,813,638 to Miller.

Various other patentees have addressed themselves to the problem of forming patterns on the conveyor. Examples of these are as follows: U.S. Pat. No. 1,778,621 to Beatty and U.S. Pat. No. 2,598,222 to Cahners et al., U.S. Pat. No. 2,525,132 to Herts et al.; U.S. Pat. No. 2,633,251 to Bruce; U.S. Pat. No. 2,716,497 to Wahl et al; U.S. Pat. No. 2,841,433 to Pagdin et al.; and U.S. Pat. No. 3,442,400 to Roth et al. These automatic stacking and pattern forming machines involved a series of complex electrical controls involving photoelectric cells, electric relays, counting mechanisms and other intricate mechanisms, for keeping track of and selectively turning articles to form a patterned layer. A mirror image of said pattern, was formed in the next successive layer, for deposit on said first patterned layer on the pallet on the elevator platform. Furthermore, an intricate and expensive set of controls was necessary to determine when to retract the stripper plate or roll table so as to deposit the patterned layers onto successive elevator. While these machines have operated satisfactorily, nevertheless, such machines operate in packaging plants — in a dusty environment and are subjected to harsh vibrations and jolts. This creates a considerable maintenance problem for the delicate and intricate controls utilized in such machines. These controls involve as much as 40 percent of the initial cost of the machine and involve, afterwards as much as 80–90 percent of all maintenance problems. Further, the controls are sophisticated and require the service of trained personnel, rather than the service of maintenance men and mechanics found normally around warehouses and packaging plants. For this reason, the problem of maintenance has been even greater than has been the problem of the initial cost.

SUMMARY OF THE INVENTION

According to this invention, a simplified mechanical apparatus is provided, utilizing visible and comprehensible control devices which may be serviced by relatively unskilled personnel. Basically, the invention involves an article loading system involving a continuously running feed conveyor and an intermittently running receiving conveyor, both of which are in the form of endless belts trained over two or more pairs of sprockets. The receiving conveyor contains one or more openings or apertures which come into intermittent registry with a vertically movable elevator platform. Mounted above the elevator platform is a fixed stop wherein articles fed from the feed conveyor onto the receiving conveyor ultimately come into abutting relationship and are held in position against the fixed stop until the aperture of the receiving conveyor comes into registry with the platform of the vertically movable elevator.

A turning or positioning station is located between the receiving zone of the receiving conveyor and the accumulating zone. The turning station is programmed to selectively position the articles fed onto the receiving conveyor by selectively turning articles in either a clockwise or counterclockwise direction and allowing other articles to pass unturned to form an open pattern on the accumulating zone of the conveyor. As the articles then come into abutting relationship with the fixed stop, a compression station in the form of two compression members push the articles inwardly and compress the pattern and locate it over the elevator platform. There it awaits the arrival of the aperture of the endless belt to be gravitationally loaded onto a pallet on the elevator platform. The power means for the positioning station and for the compression station are controlled through a series of control members in the form of limit switches and pneumatic valves which are operated by means of actuating members contained on an auxiliary control conveyor driven in synchronism with the main conveyor. These actuating members are keyed to a specific function and are in spaced relation to a point on the main conveyor. Thus, by the judicious placement of the actuating members on the auxiliary control conveyor, the control members are actuated to perform or control specific functions at a particular point on the main conveyor. These functions include the placement of the articles on the conveyor to form alternately, patterns and mirror image patterns; to compress the open patterns into closed patterns; to locate same over the elevator platform and pallet; to stop the feed conveyor and to start the main conveyor at particular points, as for example, when the aperture is passing the receiving zone so that the feed conveyor does not feed bags into the aperture.

BRIEF DESCRIPTION OF THE DRAWINGS

FIG. 1 is a diagrammatic view in elevation of a portion of the article loading system of this invention.

FIG. 2 is a plan view of the article loading system of this invention including the upper flight of the feed conveyor, the upper flight of the receiving conveyor and the upper flight of the auxiliary control conveyor.

FIG. 2a is a fragmentary diagrammatic plan view illustrating an open pattern which is the mirror image of the pattern illustrated in FIG. 2.

FIG. 3 is a diagrammatic view illustrating the formation of an open pattern on said conveyor.

FIG. 4 is a diagrammatic view illustrating the formation of a closed pattern over the elevator at the loading zone.

FIG. 5 is a diagrammatic view illustrating formation of an open pattern which is the mirror image of the pattern illustrated in FIG. 3.

FIG. 6 is a diagrammatic view illustrating the formation of a closed pattern over the elevator at the loading zone.

FIG. 9 is a diagrammatic view of the control members for the turning station, which illustrates the position of the control members and of the turning member when it is in its receiving position.

FIG. 10 is a diagrammatic view of the control members of this invention operating the power means for turning the turning member in a clockwise direction.

FIG. 11 is a diagrammatic view of the control members of this invention operating the power means for turning the turning member in a counterclockwise direction.

FIG. 12 is a wiring diagram illustrating the electrical control system for said receiving conveyor and said article feeding conveyor.

FIG. 13 is a sectional view, taken along lines 13—13 of FIG. 7, illustrating the spring loaded gate, of the turning member.

DESCRIPTION OF THE PREFERRED EMBODIMENT

Figure 7:
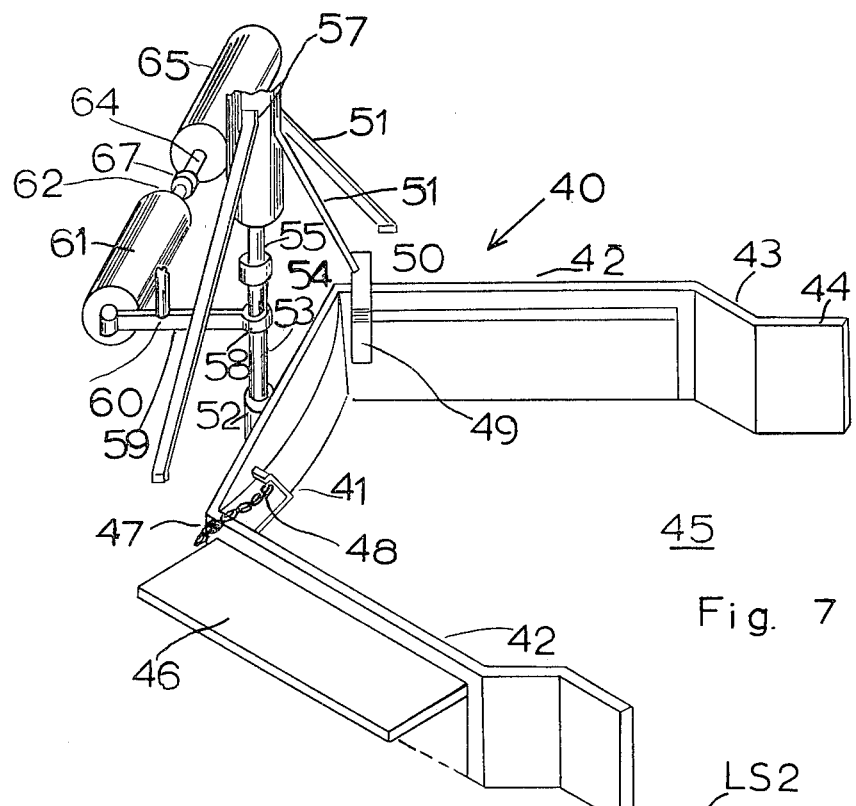
FIG. 7 is a view in perspective of the turning member of this invention.

Referring now to the drawings in detail, the article loading system of this invention consists of a receiving conveyor 3 in the form of an endless belt which receives articles from an article feeding conveyor 30 also in the form of an endless belt which, in turn, receives articles from roller conveyor 38. The receiving conveyor 3 is an endless belt, the upper flight of which may be designated as: a receiving zone 70; an accumulating zone 71, wherein articles are selectively displaced to the side of their original zone of travel and turned so as to form an open pattern and a loading zone 72, defined in the rear by a fixed stop 20 located over the elevator platform 2. The turning station 40 selectively turns some articles clockwise and to the side of their original line of travel and some articles counterclockwise and laterally from their original line of travel and allows other articles to pass unturned. Thus, the turning member is a positioning station 80 in that articles are displaced laterally relative to their original line of travel. At the loading zone 72, the articles are pushed inwardly and to the side of their original line of travel by the pattern compresser and locator 21 so that the pattern compresser and locator 21 also forms a positioning station 80. An auxiliary conveyor 19 driven in synchronism with the main conveyor 3 is formed by chains 17 trained over sprockets (not shown) on the end of shafts 16 and which contain a series of cams on cam support members 26, for actuating control members keyed to specific functions and which are in spaced relation to a position on the main conveyor 3.

Referring now to FIGS. 1 and 2, the elevator shaft 1 is diagrammatically illustrated as supporting elevator platform 2 on which is contained pallet P. The receiving conveyor 3 in the form of an endless belt is trained over sprockets 4,7,8 and 9. The driving sprocket 4 is driven by belt 6 trained over the pulley of motor 5. The endless conveyor 3 contains aperture 10, which contains a leading edge 11 and a trailing edge 12. Leading and trailing edges 11 and 12 are reinforced so as to withstand the heavy stresses encountered in the loading operation. An extension of the shaft 16 for sprockets 7 and 8 each contain another pair of sprockets which are not shown. A pair of chains 17 are trained on said sprockets so as to run in synchronism with the main conveyor 3. This forms an auxiliary conveyor containing metal rods 18 at spaced intervals on which are fixed a series of control operating members in the forms of cams which in some instances are contained on cam supports 26 and pins 27 so as to form a long cam such as CV 3, illustrated somewhat diagrammatically in FIG. 2. The judicious placement of the cams relative to a position of articles on the conveyor allows the control members which are located in bank B to control the various functions necessary to selectively place the articles in desired positions. As previously indicated, for purposes of illustration, the top flight of conveyor 3 includes receiving zone 70, accumulating zone 71 and loading zone 72. As will be noted, the loading zone 72 is bounded in the rear by fixed stop 20 which holds the open pattern in position over the elevator platform 2. The pattern is closed by the pattern compressor and locator 21 so as to locate and compress the pattern over the elevator platform containing pallet P until the aperture 10 in the endless belt comes into registry with the elevator platform 2. As this time the patterned layer of articles gravitationally slide onto a pallet P supported on the elevator platform 2. A problem has existed, in the art, of nonuniform delivery of articles to the loading or stacking stations. Thus, in previous prior art apparatus, it was necessary to provide retractable gates which allowed articles to be held on the feed and pattern forming conveyors until the patterned layer was formed. With the proposed arrangement, a problem still exists of intermittent delivery of articles. A further problem, peculiar to this invention relates to preventing articles being fed from the article feeding conveyor 30 onto the receiving conveyor 3 while the aperture 10 is in registry with the receiving zone 70. A control system is herein presented to prevent articles from being fed onto the receiving conveyor 3 when the aperture is at the receiving zone 70.

Suffice it to say, at this point, that the main conveyor belt 3 does not operate or move unless: an article is being fed from the receiving feed conveyor 30 to the receiving zone; or unless the aperture 10 is approaching the receiving zone 70; or unless an article has not yet reached the turning station 40. The article feeding conveyor 30 continuously moves unless stopped by the last three named contingencies.

Located in the loading zone 72 is the pattern compresser and locator 21 which consists of two compression members 22, each powered by cylinders 23 and piston rods 24. Thus, as is best illustrated in FIGS. 3,4,5 and 6, as a pattern is received in the loading zone area 72, the piston rods 24 of the cylinder 23 pushes the compression members 22 inwardly to push the entire layer toward the middle and directly over the pallet P, located on the elevator platform 2.

As previously mentioned, article feeding conveyor 30 is an endless belt trained over a driven sprocket 31 which is powered by belt 32 driven by motor 33 and idler sprocket 34.

Directly behind the article feeding conveyor 30 is a roller conveyor 38. The belt for the article feeding conveyor 30 is fabricated of a comparatively rough material so that when an article stops on the conveyor, the conveyor being stopped, articles on the roller conveyor 38 will build up behind the article feeding conveyor 30 without pushing articles onto the receiving zone 70 of the receiving conveyor 3. Directly beyond the receiving zone 70 of the receiving conveyor 3 is a turning member 40 which selectively turns articles 90° clockwise or 90° counterclockwise and allows other articles to pass unturned. This turning member 40 consists of a convex crosspiece 41, two flared legs 42 with turned in portions 43 and an extension 44 flared outwardly to form an open mouth 45 to receive articles from the feed conveyor 30. Each of the flared legs contain a spring loaded gate 46 which is best illustrated in FIG. 13. The gate is controlled by a trigger 48 having a straight leg portion 49 attached to the upper body portion of the gate 46. The spring 47 is attached to the upper portion of the trigger 48 and to the side of the projecting leg 42. As an article feeds into the turning member 40 and is turned in the desired position, the trigger 48 comes into contact with a dog 50 located on the end of an arm 51 which trips the trigger 48 to pull the gate upwardly as is shown in FIG. 13. This then allows the article to pass through the gate in its turned position. As the turning member 41 turns back to the neutral or receiving position, it comes back into contact with the dog 50 of arm 51 to push the gate into closed or lowered position.

Referring now in detail to the turning member 40 as illustrated in FIG. 7, a fixed collar 52 is attached to the crosspiece 41 in which shaft 53 is mounted. Collar 54 attaches the shaft 53 to the piston rod 55 of piston 56 (not shown) in cylinder casing 57. A collar 58 connects a linkage 59 to a pivot point 60 closely adjacent to the end of cylinder casing 61. Projecting from the end of cylinder casing 61 is a piston rod 62 driven by piston 63 which is arranged in abutting relation to piston rod 64 projecting from cylinder casing 65 and is held in position by a collar 67.

Figure 8:
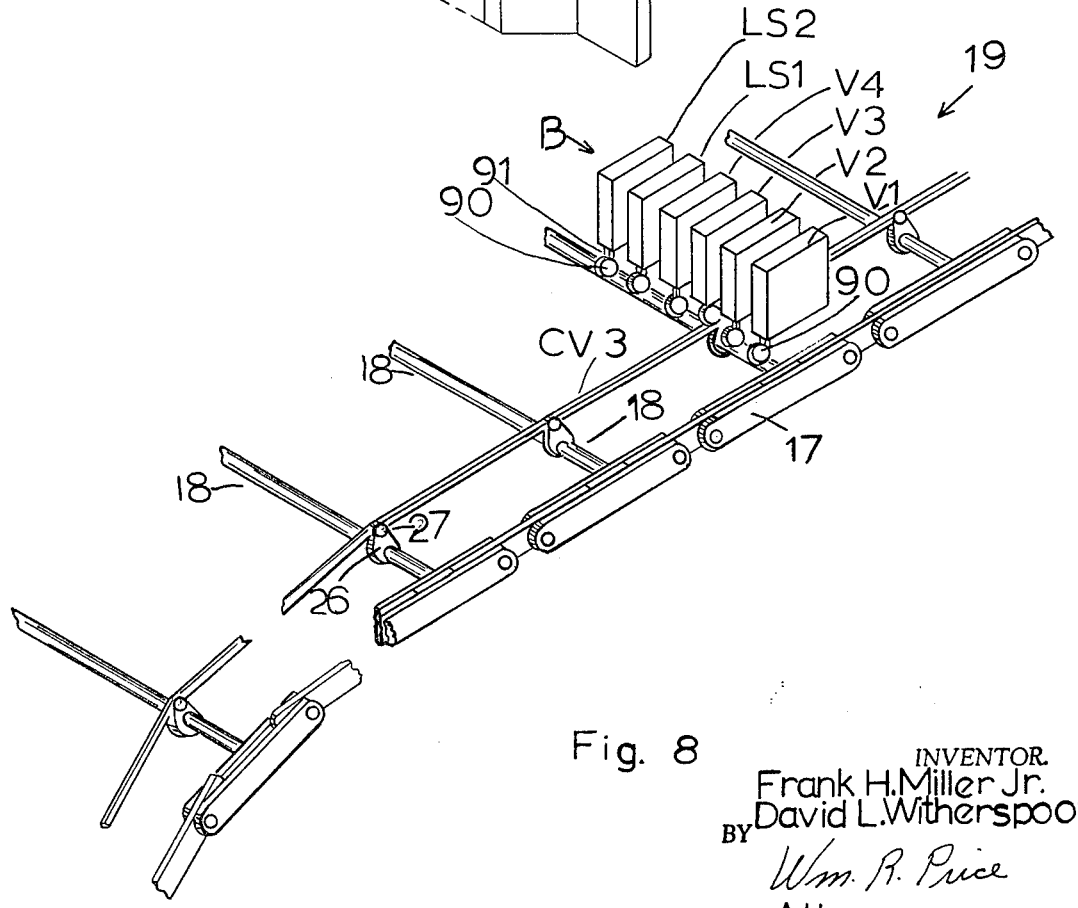
FIG. 8 is a fragmentary perspective view of the control conveyor and the bank of control members of this invention.

This driving mechanism, made up of the two opposed cylinders and piston rods forming a common piston rod assembly is controlled by a bank of control members B, mounted over the auxiliary control conveyor 19. As is best shown in FIG. 8, the bank of control members consists of cam actuated valves and limit switches, each containing a shaft 91 and a roller 90 which acts as a cam follower to operate in response to contact with a cam on the auxiliary conveyor 19. Thus, as is shown, cam CV 3 is supported by a series of cam supports 26 and consists of a series of pivotably mounted links or rods joined onto cam support 26 by means of pin 27 so as to actuate the corresponding valve V3 for a long period of time. As best illustrated in FIGS. 9, 10 and 11, air hoses 92 and 93 run from valve V1 to Cylinder 61 whereas air hoses 94 and 95 connect valve V2 to cylinder 65.

OPERATION

At the start of the loading cycle, the attitude of the various elements is as follows: elevator 1 is up ready to receive the first layer of articles with an empty pallet P in place on the elevator platform 2. The receiving conveyor 3 is located so that the aperture 10 is disposed with its trailing edge 12 immediately next to the discharge end of the feeding conveyor 30. The turning member 40 is down and in its receiving position so that the open mouth 45 is in alignment with articles fed from the feeding conveyor 30 onto the receiving zone 70. The pattern compresser and locator 21 is in the open condition. The main switch 102 of the three phase power source is closed so that power flows through leads 101 and heavy duty fuses 103 to the commutator 104 for the receiving conveyor motor 5. The open switches 116 in the motor commutator 104 is controlled by magnetic relay 115 which is connected to lead 106 for the commutator control voltage. Switch 107, when closed, allows current to flow through line 112 to the magnetic relay 115 to close the switches 116 of the receiving conveyor motor commutator 104 and thus allow the power to go directly to the driving motor 5. However, the photocell control voltage through lead 108 and switch 109 is normally closed so that the magnetic relay 110 holds the contact 111 open unless something, such as an article blocks the photocell FCPC, located between the feed conveyor 30 and the receiving conveyor 3 at the first part of the receiving zone 70. Thus, as an article feeds from the feed conveyor 30 onto the receiving conveyor 3, it blocks the light to FCPC thus opening the contact to de-energize magnetic relay 110 and close the contact 111, thus allowing current to go via 112 to magnetic relay 115, thus closing switches 116 in commutator 104 to start motor 5. Motor 5 then runs the main conveyor 3 until the article passes the photoelectric cell FCPC, thus closing the switch and energizing magnetic relay 110 to open contact 111 and cut off power to the magnetic relay 115 of the commutator. Nevertheless, it is necessary that the conveyor 3 run until the article on the conveyor reaches the turning station 40 where it will either be turned clockwise or counterclockwise or pass beneath the turning station, depending upon the part of the pattern to be formed. Motor commutator 104 is thus kept operating through the action of cam CLS 2 which operates the limit switch LS 2 to close the normally open contact allowing current, then, to run from lead 106 through limit switch LS 2 to the magnetic relay 115.

Switch 121 for the three phase power source to the motor commutator 133 for the motor 33 of the feed conveyor 30 is closed across leads 120. Current then passes through heavy duty line fuses 122 to the normally open switches 132 in the motor commutator 133. Control voltage through line 125 feeds through switch 126 through the normally closed contact of LS 1 and normally closed contact of LS 2 to energize the magnetic relay 130 and thus close the switches 132 in motor commutator 133 to run the feed conveyor motor 33. Thus, as the cam CLS 2 closes the normally open contact, feeding the motor commutator 104 to the receiving conveyor motor 5, the normally closed contact LS 2 across line 125 is opened by cam CLS 2 to de-energize the magnetic relay 130 and open switches 132 in the motor commutator 133 and thus stop motor 33. Thus, as an article feeds into the receiving zone 70 and into the turning member 40 to the proper position in the accumulating zone 71, the motor 5 for the receiving conveyor 3 is kept running while the motor 33 for the feed conveyor is stopped until the article reaches the proper position. Similarly, limit switch LS 1 operated by cam CLS 1, closes the normally open contact LS 1, across line 106 to energize the magnetic relay 115 and thus close switches 116 in motor commutator 104 to maintain the motor 5 for the receiving conveyor 3 running until the aperture 10 passes the receiving zone 70. Simultaneously, cam CLS 1 opens the normally closed contact of LS 1 across line 125, thus de-energizing magnetic relay 130 of the motor commutator 133. This opens switches 132 and cuts off power to the motor 33 for the feed conveyor 30. Thus, while the aperture 10 is approaching the receiving zone 70, articles are not fed thereon to fall through the aperture to the lower flight of the conveyor.

Referring now to FIGS. 9, 10 and 11, the power means for the turning member 40 is illustrated as comprising cylinder 61 and 65. As illustrated in FIG. 9, piston 63 is normally in the position shown in the casing 61 and the piston 66 is normally in the position shown in cylinder 65 and the turning member 40 is in its receiving position with the mouth 45 in alignment with the discharge end of the feed conveyor 30. In this position, cylinder 61, controlled by valve V1 is connected so that the pressure side through line 92 is connected to the cylinder 61 and the exhaust line 93 is attached to the other end of cylinder 61 when the valve is in closed position. Similarly, lines 94 and 95 from valve V2 are as shown with the valve in closed position. As is illustrated in FIG. 10, when cam CV1 strokes the cam follower or roller 90 and thus pushes the shaft 91 into the valve body, the pressure is diverted to line 93 and the exhaust is diverted to line 92, thus pushing the piston 63 to the other end of the casing 61, causing a net movement of the entire assembly to the right as is shown and a clockwise movement of the turning frame 90°.

Further, as is illustrated in FIG. 11, when valve V1 is actuated by cam CV1 and valve V2 is actuated by cam CV2, the pressure is through line 93 and exhaust through 92 and the pressure through 95 and exhaust through line 94, thus pushing the piston 66 and piston 63 into the positions shown, causing a net movement in the position illustrated by the arrow and a counterclockwise rotation of the turning frame 40.

Referring now to FIGS. 2, 2a, 3,4, 5 and 6, the formation of patterned layers on the accumulating zone 71 and in the loading zone 72 are shown in dotted lines on FIG. 2 and in dotted lines on FIG. 2a. As will be apparent, as bags 1, 2 and 3 are fed onto the receiving zone 70 and enter the turning frame 40, cams CV 1 and CV 2 actuate valves V 1 and V 2 to turn the turning frame counterclockwise and thus displace the bags 1, 2 and 3 with its centerline at 90° from the centerline of bags 4 and 5. Thereafter, the cam CV 3 operates V 3 to retract piston rod 55 of lift cylinder 57 and thus lift the entire turning frame 40 and allow bags 4 and 5 to pass beneath the turning frame unturned. As is shown, on the receiving conveyor in FIGS. 5 and 6 and in FIG. 2a, bags 6 and 7 of the next pattern which is the mirror image of the pattern diagrammatically illustrated in FIG. 2, also pass under the turning frame unturned so that the cam CV 3 is quite long, allowing the aperture 10 to pass the receiving zone 70 and allowing bags 6 and 7 to pass under the turning frame before finally ending and de-energizing the valve V3 to lower the turning frame 40 by extension of the piston rod 55.

Referring now to FIG. 3, the formation of the original pattern through bags 1,2,3,4 and 5 is shown in full lines and in dotted lines as the bags enter the loading zone 72. It will be noted that as the bags enter the loading zone 72, they are located on the left side of the pattern compresser and locator 21. Upon extension of piston rods 24 of cylinders 23, pushing the rams 22 inwardly, the entire pattern moves to the right in the position shown in FIG. 4 to locate the pattern directly over the elevator 2 to await the arrival of aperture 10 so as to load the entire pattern onto the pattet P on the elevator platform 2. It will be noted that in FIG. 5, the mirror image of the pattern illustrated in FIG. 3 is being formed by allowing the bags 6 and 7 to pass under the turning frame 40 unturned and by actuation of valve CV 1 to turn the turning frame clockwise for each of the bags 8,9 and 10. As is shown in dotted lines in the loading zone 72 the entire pattern is located to the right of the elevator platform 2, requiring then, that the entire pattern be pushed in the direction shown by the arrow in FIG. 6 so as to close the pattern and locate same directly over the elevator platform 2, awaiting arrival of the aperture 10.

According to this invention, by judicious placement of cams on the auxiliary conveyor 19, the cams will actuate control members in the form of limit switches or valves to perform a specific function relative to a desired position on the conveyor. Thus, by the judicious placement of cams and control members, various patterns can be made to be formed on the receiving conveyor 3 and various functions can be performed as, for example, through the actuation of valve CV 4 to actuate cylinder 23 to extend piston rod 24 and push the compression members 22 inwardly to locate the pattern over the elevator as previously illustrated.

We claim:

1. An article loading system, for loading articles in the form of layers onto a pallet supported on a vertically movable elevator which is incrementally lowered to receive successive layers of said articles, said system comprising:
   A. an article feeding means;
   B. an article receiving conveyor including:
      1. a receiving zone for receiving said articles from said article feeding means
      2. a loading zone comprising an aperture in said conveyor through which said articles gravitationally pass onto said pallet on said elevator;
   C. a fixed stop disposed over said elevator for stopping said articles and for maintaining said articles in fixed position over said elevator for loading onto said pallet through said aperture;
   D. power means for driving said receiving conveyor;
   E. a positioning station for displacing an article to the side of the original line of travel which includes:
      1. a turning station for selectively turning articles clockwise and counterclockwise to the side of their original line of travel so that said turned articles lie with their longitudinal axes at about 90° from their original position;
      2. said turning station comprising an article turning member which includes
         a. a cross piece,
         b. two projecting legs, said legs being slightly flared so as to form an open mouth in alignment with articles fed from said article feeding means onto said receiving conveyor;
      3. a first power means to selectively turn said member 90° counterclockwise and 90° clockwise.

2. An article loading system, as defined in claim 1, in which said turning station comprises:
   A. a second power means to selectively raise said receiving member.

3. An article loading system, as defined in claim 1, in which each of said projecting legs of said turning member comprises:
   A. a pivotably mounted gate;
   B. a spring in operative relation with said gate for holding said gate closed when the turning member is turning, but which allows the gate to open and the articles to pass through said gate after the turn is complete.

4. An article loading system, as defined in claim 3, the combination with said spring of a trigger in operative relation with said gate,
   A. the further combination therewith of a dog located at the end of the swing of said turning member to trip said trigger to swing the gate outwardly, and
   B. a dog to engage said trigger on the return swing to wind up the spring for the next cycle.

5. An article loading system, as defined in claim 3, in which each of said flared legs contain an angular extension,
   A. said extension flaring medically inwardly then turning sharply outwardly to form a surface which directs an article into said turning member.

* * * * *